(12) United States Patent
Kowles et al.

(10) Patent No.: US 10,579,533 B2
(45) Date of Patent: Mar. 3, 2020

(54) CACHE TRANSFER TIME MITIGATION

(71) Applicant: Seagate Technology LLC, Cupertino, CA (US)

(72) Inventors: Andrew Michael Kowles, Lyons, CO (US); Xiong Liu, Singapore (SG); Mark Gaertner, Vadnais Heights, MN (US); Kai Yang, Singapore (SG); WenXiang Xie, Singapore (SG); Jiangnan Lin, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 141 days.

(21) Appl. No.: 15/719,957

(22) Filed: Sep. 29, 2017

(65) Prior Publication Data

US 2019/0102307 A1  Apr. 4, 2019

(51) Int. Cl.
G06F 3/06 (2006.01)
G06F 12/0871 (2016.01)
G06F 12/0875 (2016.01)
G06F 12/0811 (2016.01)

(52) U.S. Cl.
CPC .......... *G06F 12/0871* (2013.01); *G06F 3/061* (2013.01); *G06F 3/065* (2013.01); *G06F 3/0676* (2013.01); *G06F 12/0811* (2013.01); *G06F 12/0875* (2013.01); *G06F 3/0601* (2013.01); *G06F 2212/217* (2013.01); *G06F 2212/283* (2013.01); *G06F 2212/452* (2013.01)

(58) Field of Classification Search
None
See application file for complete search history.

(56) References Cited

U.S. PATENT DOCUMENTS

| | | | |
|---|---|---|---|
| 4,636,886 A | 1/1987 | Schwarz | |
| 5,583,712 A | 12/1996 | Brunelle | |
| 5,619,387 A * | 4/1997 | Ottesen | G11B 5/012 348/E7.073 |
| 6,418,510 B1 | 7/2002 | Lamberts | |
| 7,012,771 B1 | 3/2006 | Asgari et al. | |
| 7,133,241 B2 * | 11/2006 | Che | G11B 5/012 360/75 |
| 7,495,857 B1 * | 2/2009 | Bennett | G11B 5/59633 360/75 |
| 8,948,523 B2 * | 2/2015 | Oya | G06T 9/00 382/232 |
| 2014/0019681 A1 * | 1/2014 | Huff | G06F 12/0871 711/113 |
| 2016/0148643 A1 | 5/2016 | Gao et al. | |

FOREIGN PATENT DOCUMENTS

JP  410312647 A * 11/1998 ............. G11B 20/12

* cited by examiner

*Primary Examiner* — Brian R Peugh
(74) *Attorney, Agent, or Firm* — Holzer Patel Drennan

(57) ABSTRACT

In accordance with one implementation, a method for mitigating cache transfer time entails reading data into memory from at least two consecutive elliptical data tracks in a main store region of data storage and writing the data read from the at least two consecutive elliptical data tracks to a spiral data track within a cache storage region.

16 Claims, 5 Drawing Sheets

CACHE TRANSFER TIME MITIGATION

BACKGROUND

Read and write caches are commonly used to temporarily store select data for fast access. In different systems, cache service time is affected by a number of factors including, for example, a type of storage media used for the cache, cache location within a storage media, data storage density (e.g., tracks-per-inch, bits-per-inch), as well as read and write speeds that can be realized in transferring data to and from the cache. Minimization of cache service time is particularly important in data storage systems that read and write large of amounts of cache data.

SUMMARY

Methods disclosed herein reduce time for transferring data to a cache. According to one implementation, a method disclosed herein entails reading data into memory from at least two consecutive elliptical data tracks in a main store region of data storage and writing the data read from the at least two consecutive elliptical data tracks to a spiral data track within a cache storage region.

According to another implementation, a disclose method further entails determining a linear storage density capability of each of a plurality of transducer heads; identifying a subset of the transducer heads for which the determined linear storage density capability satisfies a predetermined threshold; and assembling a storage device including at least one of the identified subset of transducer heads configured to write to a defined cache data region on a storage media.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

Figure 1:
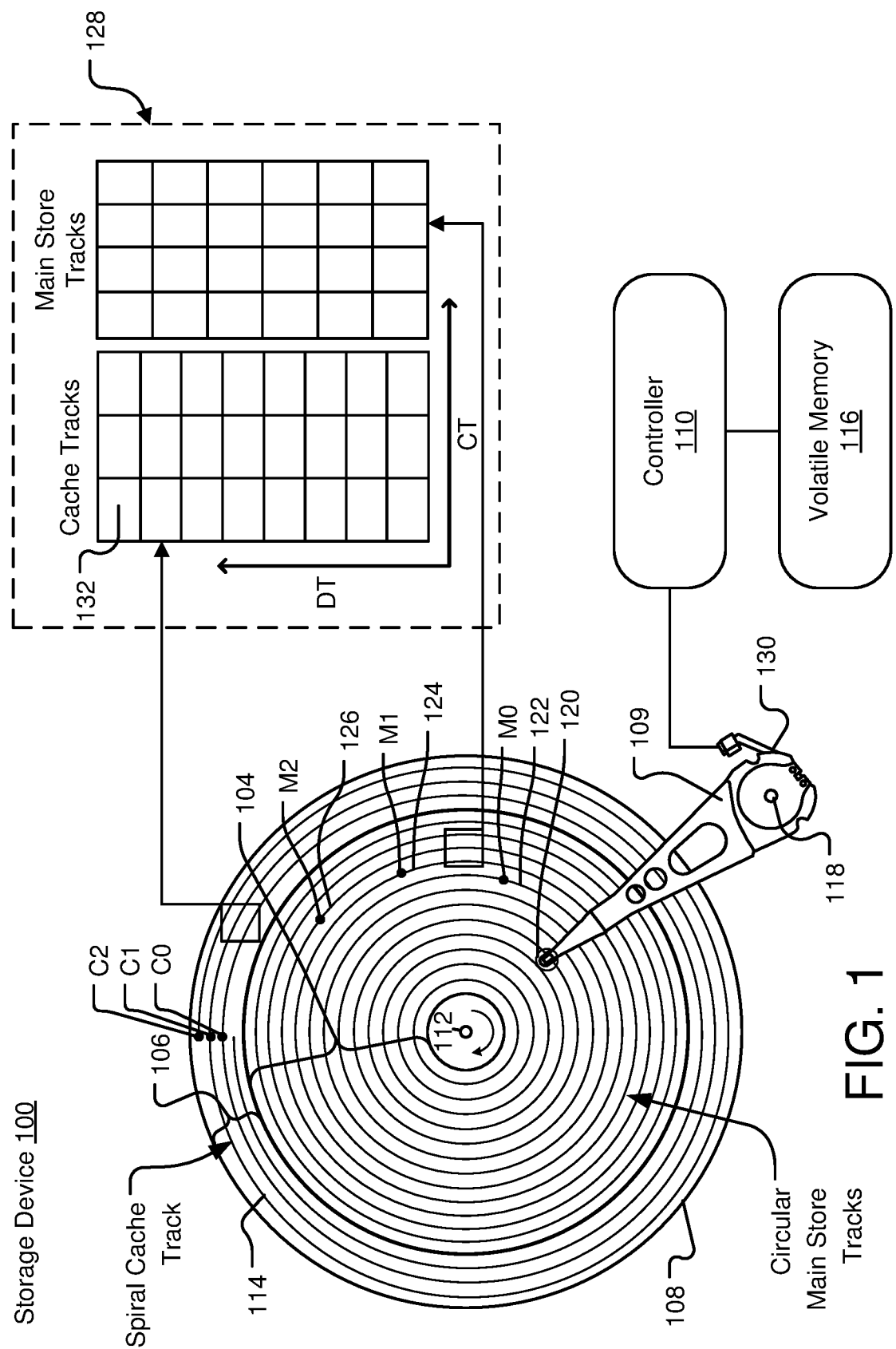
FIG. 1 illustrates an example storage device including a cache with several features for mitigating cache service time.

FIG. 1 illustrates an example storage device 100 including a cache 106 with several features for mitigating cache service time. In general, cache service time is a combination of cache access time and cache transfer time. Cache access time refers to a cache read/write delay incurred while the storage system readies itself to access (e.g., read or write) data at a cache location. Cache transfer time, in contrast, refers to delay incurred while requested data is being read from or written to the storage media 108. Together, the cache access time and cache transfer time represent a total time duration for servicing a cache access operation, such as a total time to initiate and execute a command to write data to or read data from the cache 106.

The example storage device 100 is a hard drive assembly including at least one storage media 108 and a transducer head 120 (also referred to herein as a read/write head) positioned at an end of an actuator arm 109 configured to rotate to position the transducer head 120 for reading data from or writing data to underlying data tracks on the storage media 108. Although the storage media 108 is shown to be a magnetic disc, the storage media 108 may, in other implementations, include one or more storage media of a variety of other types of non-volatile memory including, for example, solid state drives, flash memory, optical storage discs, etc. While FIG. 1 shows a single storage media 108, other number of media (e.g., two discs, four discs, six discs, etc.) can alternatively be included within the storage device 100.

During operation of the storage device 100, the transducer head 120 flies in close proximity above the surface of the storage media 108 while the storage media 108 is rotated by a spindle motor that rotates about an axis of rotation 112. A rotary voice coil motor that rotates about an actuator axis of rotation 118 is typically used to position while one or more transducers (e.g., read or write elements) of the transducer head 120 read data from and write data to a target data track. A flex cable 130 provides electrical connection paths between the transducer head 120 and a controller 110 while allowing pivotal movement of the actuator arm 109 during operation.

In addition to the cache 106, the storage media 108 also includes a primary user data storage area referred to herein as a main store 104. In one implementation, physical data blocks within the main store 104 are statically mapped to logical block addresses (LBAs) of a host addressing scheme. In contrast, the 106 is not statically mapped to host LBAs, and the controller 110 dynamically manages a mapping scheme of host LBAs to temporary locations in the cache 106. In different implementations, the cache 106 may serve different purposes such as to store frequently read data for quick read access, frequently updated data for quick write access, and/or to act as a "scratch pad," as described below. Accordingly, the term "cache" is used herein to refer to any of a media scratch pad, write cache, and/or read cache.

The term scratch pad generally refers to a cache region that is utilized to store new data and/or complement data during execution of a write operation. The term "complement data" refers to unchanged data that is re-written during execution of a write operation to modify one or more data cells on a storage media. Certain types of storage systems read and write large amounts of complement data whenever one or more data cells are updated. For example, shingled magnetic recording (SMR) systems and interlaced magnetic recording (IMR) systems typically read and re-write a grouping data tracks whenever one or more data cells within the grouping are changed. In these systems, an update to a data track may entail multiple steps including: reading multiple adjacent data tracks (e.g. a data band) into a cache scratch pad (e.g., a region within the cache 106), modifying one or more of the read data cells in volatile memory 116 (e.g., RAM, DRAM), and re-writing the read data back to the storage media 108 with one or more changed cells. This type of operation is sometimes referred to as a band re-write operation (BRO). An example BRO operation is described in detail with respect to FIG. 3, below.

In storage systems that implement BRO operations while updating data, writing data to a media scratch pad can take as long as one-third or more of the total process time for the BRO to execute. Reductions to cache service time can therefore translate to large performance gains in BRO-type systems. The herein-described technology provides a number of cache storage techniques that help to decrease total cache service time, primarily by reducing cache transfer time (e.g., time for reading and writing data to the cache 106) as compared to a time for reading and writing data to the main store 104. The herein disclosed cache storage techniques provide performance benefits when implemented within a media scratch pad region of a BRO-type system, but also provide benefits in non-BRO systems that include traditional read or write caches but do not utilize a media scratch pad. In various implementations, the cache 106 may employ different recording techniques including without limitation shingled magnetic recording, interlaced magnetic recording, and conventional magnetic recording.

Cache transfer time is a combination of the time that the transducer head 120 spends reading and/or writing data in the cache and also the time that it takes for the actuator arm 109 to move the transducer head 120 from one cache track to another during a multi-track cache write. The amount of time spent reading and/or writing in the cache depends primarily on the rate of rotation of the storage media 108 and the linear density of data bits rotating below the transducer head 120 on the storage media 108. In contrast, the time that it takes for the actuator arm 109 to move the transducer head 120 from one cache track to another is a combination of seek time and settle time, referred to jointly herein as "seek-and-settle time." Seek time entails movement of an actuator arm from one radial position to another that is within a predetermined distance of a destination track, such as a distance of one full track width from a destination track. After reaching such a predetermined distance from the destination track, the servo system transitions to a settling mode wherein the transducer head is "settled" on to the destination track. The term "settle time" refers to the duration of this settling mode. In one implementation, the settle mode following a seek entails a rotation of approximately 25 servo wedges below the transducer head 120, which may, for example, provide a position error signal within 8% of the track pitch.

The various implementations disclosed herein provide cache features for increasing cache linear storage density and/or eliminating intra-cache seek-and-settle time to collectively reduce cache transfer time. Although these features may yield best performance when used in combination within the storage device 100, benefits may also be realized from individual use of these features or use of these features in various combinations different from the examples provided herein.

In FIG. 1, the cache 106 is shown to include a spiral data track 114 that completes multiple revolutions around the disc center of rotation 112. Data tracks within the main store 104 are, in contrast, generally elliptical (e.g., circular or substantially circular). In general, the spiral data track 114 is long enough to store data on multiple elliptical tracks from the main store 104. For example, data of multiple circular main store tracks (e.g., tracks 122, 124, 126) may be written in sequence to the single spiral data track 114. When multiple data tracks in the main store 104 are read and written as a contiguous sequence to the spiral data track 114 in the cache 106, seek-and-settle time is effectively eliminated, reducing total cache transfer time.

To further illustrate the time-saving effect of the spiral data track 114, various data tracks in FIG. 1 includes dots representing a starting index (e.g., zero sector) of a corresponding data track. For example, the positions C0, C1, C2 each represent a starting sector index (e.g., sector 0) of a cache data track and the positions M0, M1, and M2 each represent a starting sector index for one of data tracks 122, 124, and 126, respectively.

Since the transducer head 120 incurs seek-and-settle time during a radially-outward move between any two consecutive tracks in the main store 104, such as when moving from data track 122 to 124, the starting sector indices M0, M1, and M2 are staggered in the down-track (DT) direction. For example, the seek from the position M0 on data track 122 to a nearest-accessible position (M1) on the data track 124 spans a period of time during which the storage media 108 rotates slightly, permitting the position M1 to rotate under the transducer head 120 and be immediately accessible prior to termination of the seek operation. By staggering the starting sector of each adjacent main store track, as shown, the transducer head 120 is permitted to read data according to a consecutive LBA sequence from adjacent main store data tracks despite the rotational latency that interrupts access to adjacent data tracks. When the data tracks 122, 124, and 126 are written in sequence to the spiral cache track 114, seek-and-settle time is effectively eliminated. As a result, the starting sector indices (e.g., sector 0) of each adjacent track can be radially aligned within the cache 106, as shown by exemplary starting sector positions C0, C1, and C2.

Notably, some implementations of the cache 106 include multiple spiral data tracks that each complete multiple revolutions around the disk axis of rotation. For example, the multiple spiral tracks may be separated from one another by an empty track (e.g., a "guard track") and/or separated from one another by one or more non-contiguous regions of the main store 104.

In addition to having the spiral shape described above, the data tracks in the cache 106 may be wider in width than data tracks within the main store 104, as shown in the magnified view 128. This increase in track width yields several benefits, described below.

First, the use of wider data tracks in the cache 106 reduces settle time for seeks that reposition the transducer head 120 from the main store 104 to the cache 106. Settle time is typically inversely proportional to track width. Therefore, the use of wider data tracks in the cache 106 yields a reduction in the settle time following each seek between the main store 104 and the cache 106. Although the time to initially settle into a cache location may, by some definitions, be considered part of "cache access time" rather than "cache transfer time," the reduction of this time nonetheless effects a reduction in cache service time (e.g., the sum of access time and transfer time) for any given read or write operation to the cache 106.

In addition to decreasing settle time for seeks from the main store 104 to the cache 106, the use of wider data tracks within the cache 106 also facilitates an increase in an effective cache data rate. Referring to magnified view 128, the data tracks in the cache 106 have an increased density of magnetic bits (e.g., a magnetic bit 132) in the down-track (DT) direction as compared to the main store 104. This density in the down-track direction is also referred to as linear storage density or bits-per-inch (BPI). A decrease in track density (e.g., as achieved by use of wider data tracks spanning the cross-track (CT) direction) in the cache 106, as shown, permits this increase in BPI to occur without a corresponding increase in bit error rate (BER). Ultimately, the increase in BPI within the cache 106 translates to an increase in read/write rate since it permits more data bits to rotate under the transducer head 120 while the storage media 108 rotates at a relatively constant velocity. As a result, boosting BPI (and cache data rate) in the illustrated manner yields a direct reduction in cache transfer time.

Increased data track width within the cache 106 can be achieved in different ways. In one implementation, the track pitch or center-to-center spacing between adjacent tracks is initially set (e.g., during a factory calibration) to be larger within the cache 106 than in the main store 104. In different implementations, track width can be adjusted to be commensurate with the set track pitch in different regions of the storage media 108 via a number of suitable techniques including without limitation: increasing a heat source power level (e.g., if the storage device 100 is a heat-assisted magnetic storage recording (HAMR) device; utilizing a different (e.g., larger) write element to write data to the cache 106 than the main store 104; and altering write current parameters (e.g., amplitude, overshoot, rise time) when writing to the cache 106 as compared to the main store 104.

In various implementations, the storage device 100 includes additional features for reducing cache transfer time. In one implementation, the controller 110 reformats data when moving it between the main store 104 and the cache 106 in order to further increase the cache transfer speed. For example, the cache 106 may be formatted into sectors that are larger in size than a sector formatting scheme of the main store 104. As a result, a contiguous data segment in the cache 106 may include fewer "non-user data bits" (e.g., header information, parity bits used for implementing error correction code (ECC)) than a corresponding segment in the main store 104 storing the same user data. Examples of variable sector size is discussed in detail with respect to FIG. 2.

In still another implementation, the storage device 100 is tuned to utilize a high-performing transducer head when writing to the cache 106. For example, some implementations provide for testing and deliberate selection of high-performing transducer head(s). For example, attainable BPI of various transducer heads can be measured during factory tests and transducer head(s) with high BPI performance can be deliberately selected for incorporation into the storage device 100 and/or cache placement may be influenced by the performance statistics of the different transducer heads within a multi-head storage device. Example implementations of transducer head selection and/or cache placement for high performance are described in detail with respect to FIG. 3.

The controller 110 is shown within the storage device 100; however, some implementations may incorporate aspects of the controller 110 in hardware and/or software external to the storage device 100. Computer-executable instructions of the controller may be stored on any computer-readable storage media that is a tangible article of manufacture. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism.

Figure 2:
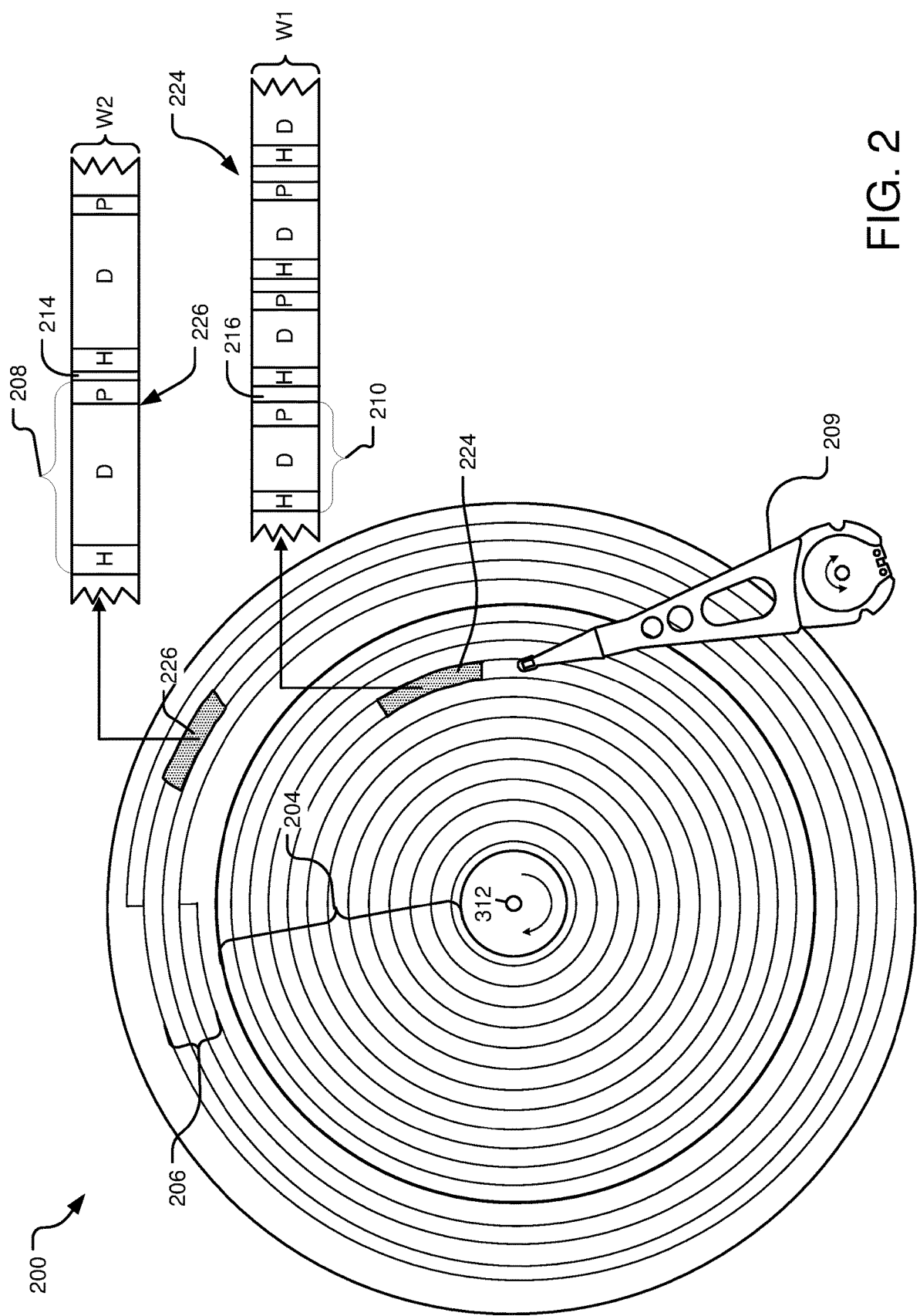
FIG. 2 illustrates an example system including a cache with several features that contribute to migration of cache transfer time.

FIG. 2 illustrates an example system 200 including a cache 206 with several features that contribute to migration of cache transfer time. In particular, the cache 206 includes features that contribute to an increase in effective data rate for read/write operations to the cache 206 as compared to an effective data rate for read/write operations to a main store 204.

In the example of FIG. 2, a controller (not shown) of the storage system 200 executes a cache write that entails reading data of a main store data segment 224, reformatting the data according to a cache-specific formatting scheme, and writing the reformatted data as a reformatted cache data segment 226, which is then stored as a contiguous segment in the cache 206. In one implementation, the cache-specific formatting scheme defines cache data sectors (e.g., a cache data sector 208) that are larger in size than main store data sectors (e.g., a main store data sector 210). The size differential between cache data sectors and main store data sectors may vary considerably from one implementation to another. In one example contemplated, the main store data sectors are 4 KB and the cache data sectors are 64 KB. The cache data sectors have a higher formatting efficiency, meaning that the cache 206 allocates a larger percentage of its total data bits to storing user data than the main store 204. As a result, the user data can be accessed from the cache 206 more quickly than the same user data can be read from or written to the main store data segment 224.

In FIG. 2, the main store data segment 224 and the reformatted cache data segment 226 each include multiple individual sectors (e.g., the main store data sector 210 and the cache data sector 208), and each individual sector is made up of three basic parts: a sector header (e.g., "H"); a data area (e.g., "D"), and an error correction code area (e.g., "P" for 'parity bit'). The sector headers (H) contains various information generally utilized by a storage device controller to verify position accuracy and integrity of header position information. For example, the header of the main store data sector 210 may include address identification information used to ensure that a transducer head is positioned over a correct data sector, header parity bytes to ensure that the header is read or written correctly, and one or more sync bytes indicating an end of a header region. The data area 'D' of each sector contain user data, while the ECC areas (P) contain parity bit(s) to verify integrity of the user data. In some implementations, the parity bits (P) are included within the data area (D), such as at the end of the data block or mixed within the data block. In many storage devices data management schemes, data sectors with a smaller sector size have a larger percentage of corresponding parity bits than data sectors of a larger sector size.

One factor influencing how quickly the data can be read from the cache 206 and the main store 204 is "code rate," which generally refers to a ratio of useful data bits (e.g., user data) to total data bits (e.g., user data plus parity bits) included within a particular storage region. In one implementation, the reformatted cache data segment 226 stores the same user data as the main store data segment 224 but is the reformatted data is encoded with a higher code rate. For example, the reformatted cache data segment 226 includes fewer total parity bits or fewer header bits than the main store data segment 224.

In reformatting the main store data segment 224, the storage device controller combines multiple data regions from different sectors of the main store data segment 224 to create each individual cache data sectors (e.g., the cache data sector 208) of the reformatted cache data segment 226. Thus, the cache data sectors have larger "D" areas than corresponding "D" areas of the main store data sector.

In one implementation, there exist fewer parity bits within the cache data sector 208 than within the main store data sector 210. This reduction in parity bits is in part made plausible due to the increased length of the cache data sector as compared to the main store data sector. When data sectors are smaller (e.g., 4k, as in one example main store data sector), the entire data sector may be affected by off-track writing due to the similarity in size between the data sector and the servo wedge. Therefore, a greater number of parity bits may be needed to recover data corrupted by off-track writing in a smaller data sector. When data sectors are larger, in contrast (e.g., a 64-kb sector, as in one example cache data sector), off-track writing within a servo wide affects a much smaller portion of the data in the data sector, so the data is more likely to be adequately recovered with fewer parity bits.

In some implementations, the above-described reformatting of the main store data segment 224 increases in format efficiency in other ways in addition to or in lieu of alterations to ECC correction capability. For example, gaps between each data sector (e.g., gaps 214, 216) may be made smaller in the cache 206 than within the main store 204.

Additionally, format efficiency is increased due to a decrease in header overhead. The total number of headers is reduced when larger data sectors are utilized in the cache 206 than in the main store 204 (e.g., because a reduction in total sectors correlates with a reduction in sector headers). In addition, each header may be made smaller in size within the cache 206 than within the main store 204. For example, a data track in the main store 204 may include 400 4kb data sectors, where each sector has 9 bits of header information (e.g., because 9 bits are used to represent the range of values 0-511). Thus, a single data track in the main store 204 may include 3600 total bits of header data. In contrast, a data track in the cache 206 may store a same amount of data as the 400, 4 kb main store sector track but store such data in larger data sectors such that a single track includes 25 64 kb data sectors, where each sector has 6 bits of header information (e.g., because 6 bits are used to represent the range of values 0-25). In this example, the 3600 bits of header data in a track of the main store 204 are reduced to 150 bits of header data in a track of the cache 206 storing an equal amount of data.

In another implementation, servo sectors within the cache 206 are spaced further apart than servo sectors in the main store 204, effectively lowering the servo sector sampling rate. The use of wider data tracks in the cache 206 may help to compensate for any increase in off-track alignment due to the decreased sampling, effectively allowing fewer bits to be devoted to servo within the cache 206 without an unacceptable increase in position error.

In FIG. 2, the main store data segment 224 is stored on a data track with a width (W1) that is less than a width (W2) of a data track storing the reformatted cache data segment 226. In other implementations, data tracks of the main store 204 and the cache 206 may be of identical or similar width.

Figure 3:
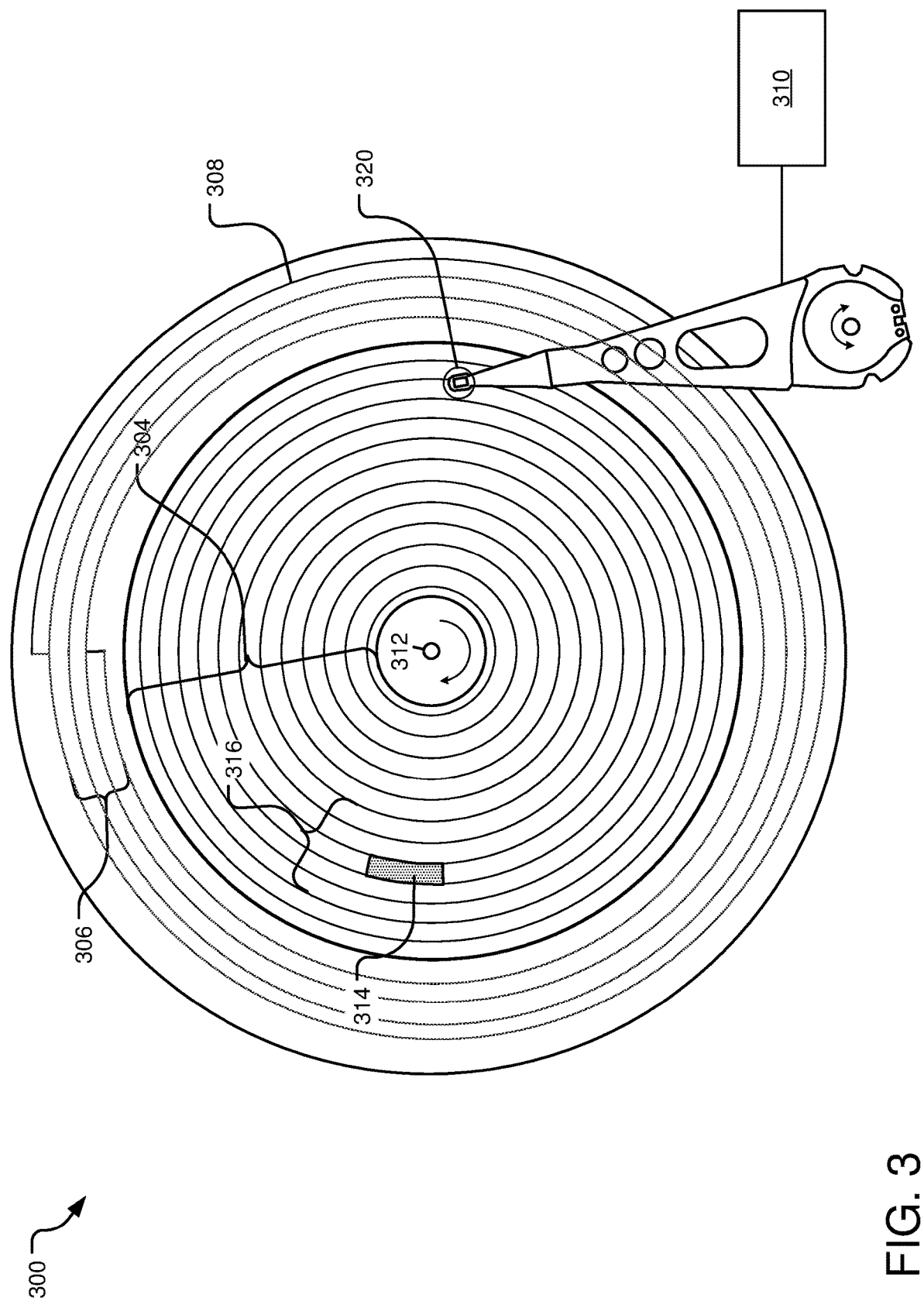
FIG. 3 illustrates an example system for implementing a cache write based on a dynamic assessment of access time.

FIG. 3 illustrates an example band re-write (BRO) operation in a storage system 300 that includes a magnetic storage medium 308 with a spiral cache region 306. The spiral cache region 306 including a single spiral track that makes multiple revolutions around a central axis of rotation 312 for the storage medium 300. In one implementation, the spiral cache region 306 is a sole cache region on the storage medium 300 or within an associated storage device. In other implementations, the spiral cache region 306 is one of multiple non-contiguous cache regions that are distributed across the storage medium 300 or across different storage media in a same storage device. The cache region 306 is shown near an outer diameter of the magnetic storage medium 308 but may, in other implementations, assume a variety of different.

In addition to the spiral cache region 306, the storage media 300 includes a main store region 304 that includes storage space mapped to a full range of LBAs of a host addressing scheme. Individual data tracks within the main store 304 are circular in FIG. 3 but may, in some implementations, be spiral like the spiral cache region 306. In one implementation, the main store 304 and/or the cache region 306 store data according to a shingled magnetic recording (SMR) format. In another implementation, the main store 304 and/or the cache region 306 store data according to an interlaced magnetic recording (IMR) format.

In the illustrated example, a storage controller 310 receives a command to update a data segment 314 within a data band 316 (e.g., five consecutive data tracks) in the main store 304. For example, a host (not shown) transmits a new data segment to the controller along with address information indicating a corresponding position within the data band 316 where the new data segment is to be inserted (e.g., at the position of the data segment 314). In preparation for execution of the write command, the controller reads the entire data band 316 into volatile memory, reformats the data in memory according to predetermined cache sector formatting parameters (e.g., described below), repositions a transducer head 320 to access a starting index of an available storage location in the spiral cache region 306, and begins writing the reformatted data read from multiple tracks of the data band 316 to the spiral cache region 306. Reformatting the read data prior to the write to the spiral cache region 306 may entail different steps in different implementations.

In one implementation, the spiral cache region 306 stores data according to a cache sector format that is different from a main store sector format used within the main store 304. For example, each sector of the cache sector format may include a much larger data region between header and ECC bits than the data sectors of the main store sector format. The size and content of the cache sector format and main store sector format are accessible to the storage controller 310 and used during each write of data between the main store 304 and the spiral cache region 306.

In one implementation, reformatting the data entails combining data regions of multiple sectors of the main store sector format into a single contiguous data region within a single sector of the cache sector format. Thus, creation of the data regions of the cache sector format may entail re-arranging user data relative to other bits (e.g., header information, parity bits).

In another implementation, reformatting the data read from the data band 316 into the cache sector format entails altering an ECC, such as by increasing a code rate (e.g., decreasing a fraction of parity bits relative to total bits). For example, each sector in the main store 304 may store one or more parity bits for checking integrity of the user data within the sector whenever that data is read or written. When multiple data segments of the different sectors in the main store 304 are combined into a single data segment of a single larger sector in the cache data region 306, the original parity bits of each individual sector may be discarded and replaced by one or more newly-created parity bits providing error-correction capability for the entire (larger) data segment of the newly-created cache data sector. As a result, the reformatted data may include fewer total parity bits than the data originally read from the data band 316.

In one implementation, the reformatted data is written to the spiral cache region 306 while the read data is preserved according to the original (e.g., main store) formatting within volatile memory of the device. After writing the reformatted data is written to the spiral cache region 306, the controller 310 inserts the new data segment from the host into the read data of the original format (e.g., within volatile memory of the storage device), and writes the modified data back to the data band 316 according to the original formatting parameters. In one implementation, the reformatted data in the spiral cache region 306 is not accessed again unless data is corrupted in the main store 304 during the write operation, such as if an unexpected power failure occurs during the write to the data band 312. In the event that the data is corrupted in the main store 304 (e.g., within the data band 316) during the write, the control reads the reformatted data in the cache storage region 306, reformats the read data back into its original form according to the main store sector formatting parameters, and restores the corrupted data blocks of the main store 304 with the resulting data.

Figure 4:
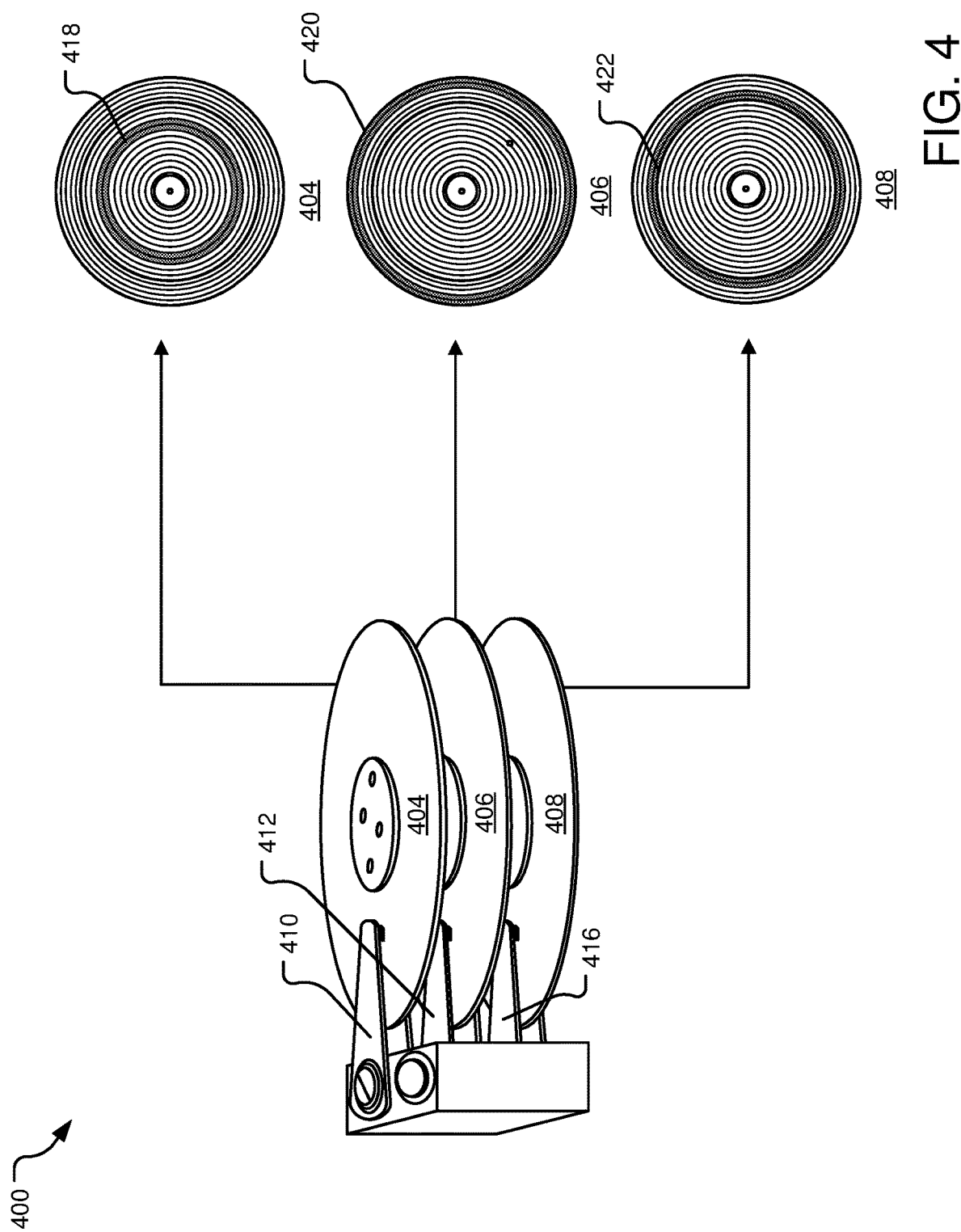
FIG. 4 illustrates an example band re-write (BRO) operation in a storage system that includes a magnetic storage medium with a spiral cache region.

FIG. 4 illustrates an example storage system 400 with cache placement parameters tuned to effectuate an increase in cache transfer time. The storage device 400 is a hard drive assembly including multiple disks (e.g., 404, 406, and 408) and multiple actuator arms (e.g., actuator arms 410, 412, 414) each attached to a corresponding transducer head. Although FIG. 4 shows three actuator arms for simplicity, some implementations include a different actuator arm for one of the disk surfaces. For example, a storage device with three disks and six disk surfaces may include six actuator arms.

The storage system includes one or more cache regions (e.g., cache regions 418, 420 and 422) selectively located so as to facilitate reads and writes of such regions at data transfer rates satisfying predetermined 'high performance' criteria. In general, the available data transfer rate for a region may depend upon various factors such as the track size (e.g., the number of sectors that can be read before a seek operation is performed) and the linear storage density (e.g., BPI) available for a particular data write, which itself depends on performance characteristics of the particular transducer head that performs the data write. The data transfer rate can therefore be improved (decreased) by selectively locating a cache in in areas where the track length is longer (e.g. near the outer diameter) and/or by placing the cache in a location that is accessible by a high-performing transducer head. Exemplifying this, the storage device 400 includes multiple cache regions that are selectively located on available storage space of the multiple disks 404, 406, and 408 based on identification of storage regions that satisfy high performance criteria.

A region satisfies high performance criteria if the storage device 400 is capable of reading and writing data to the region with an acceptable bit error rate (BER) below a predetermined threshold. For example, the region 418 may satisfy the high performance criteria because it is accessible for reads and writes by a transducer head with "high BPI capability." As used herein, a transducer head with "high BPI capability" is capable of reading and writing with a BPI in excess of a predetermined threshold while maintaining an acceptable error rate (e.g., a rate at some predetermined threshold). Heads may, for example, be tested during manufacturing processes to determine associated BPI read and write capability (also referred to herein as a linear storage density capability).

In some implementations, transducer heads are tested for BPI capability prior to assembly of the storage device 400. For example, heads that demonstrate high BPI capability are deliberately selected for inclusion in the storage device 400 and/or for inclusion at a particular location (on a particular actuator arm) within the storage device. If, for example, the cache region 420 is predefined in an outer diameter (OD) location on the disk 420, as shown, a high-performing transducer head may be deliberately selected for attachment to the actuator arm 412 positioned to provide access to the cache region 420.

In other implementations, the transducer heads are tested after assembly of the storage device 400. For example, the BPI capability is tested for six transducer heads included in the storage device 400 and heads with high BPI are identified. Cache regions are then selectively located on the disks 404, 406, and 408 based on the positions of the identified heads with the high BPI capability. If, for example, a transducer head on the actuator arm 410 demonstrates a highest BPI capability of all of the heads included in the storage device 400, a cache region may be selectively defined on the upper surface of the disk 404 that is accessible by the transducer head on the actuator arm 410.

In still further implementations, the BPI capability of the different transducer heads is tested in with respect to different regions of a corresponding surface. For example, BPI testing may reveal that a transducer head on the actuator arm 416 demonstrates high BPI capability when writing and reading to a first region (e.g., the cache region 422) of the magnetic disk 408 but does not demonstrate high BPI capability when writing and reading to other areas of the magnetic disk. Based on this, the cache region 422 may be selectively defined in the first region.

Still further, the performance capability of a region may further depend on the location of the region independent of head performance. In general, locations near the outer diameter (OD) of magnetic media can include a larger total number of sectors along a track (e.g., if the track is generally cylindrical) than regions toward the middle or inner diameter (ID) of a storage media. As a result, a transducer head can read more data bits during a single rotation of the disk when positioned near the OD than near the ID. Consequently, locating a cache at an OD region of a magnetic disk can increase the cache data transfer rate, especially when such OD regions are accessible by a transducer head that has a high BPI capability.

In one example implementation, OD regions are initially identified as potential cache candidates on each of the multiple disks 404, 406, and 408. Factory performance tests are conducted to identify which of the six transducer heads in the storage device 400 demonstrate high BPI capability. One or more cache regions are then selectively defined within a subset of the OD regions that are accessible by a transducer head that demonstrates high BPI capability (e.g., either in general or when reading and writing to that correspond OD region). For example, the cache region 420 may be selected as a cache region because of its outward radial location and because it is accessible by a transducer head that has demonstrated high BPI capability.

Figure 5:
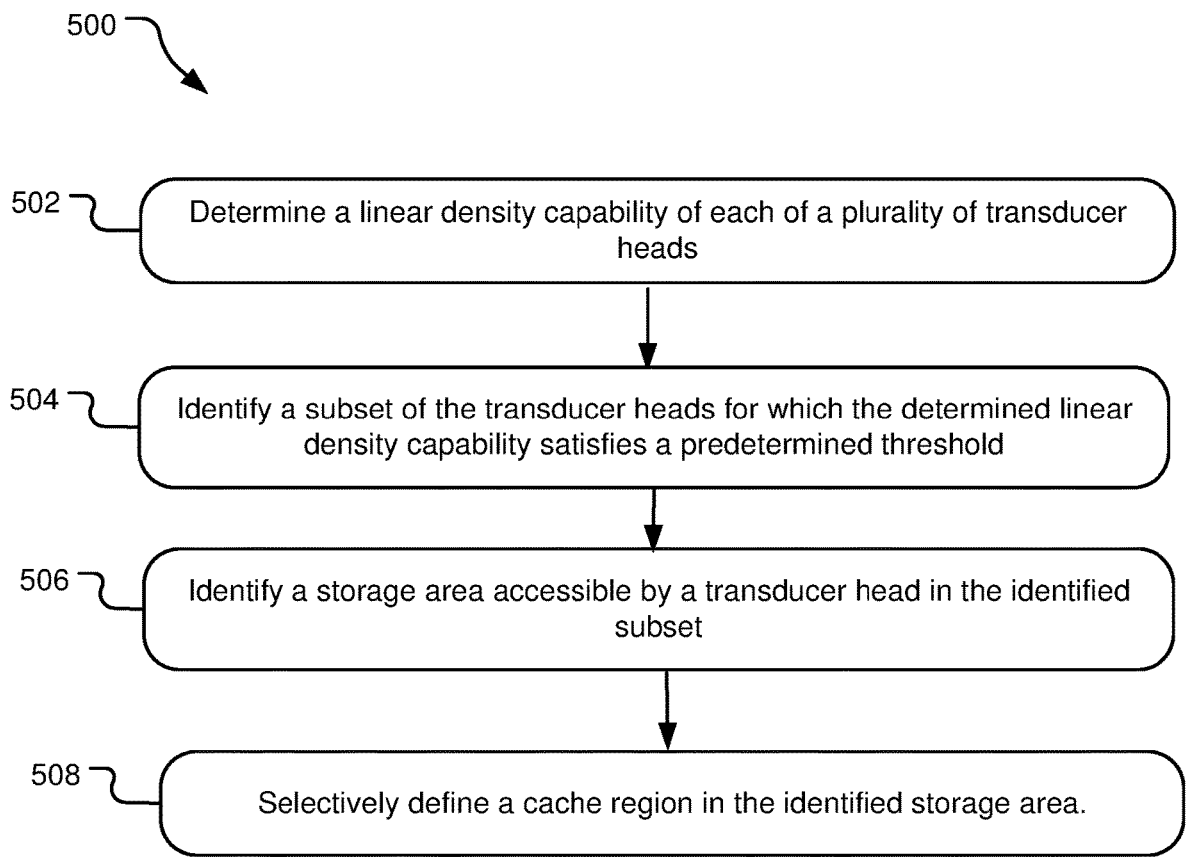
FIG. 5 illustrates an example storage system with cache placement parameters tuned to effectuate an increase in cache transfer time.

FIG. 5 illustrates example implementations for mitigating cache transfer time by defining cache regions in storage areas where high BPI performance can be realized. A determining operation 502 determines a linear storage density capability of each of a plurality of transducer heads. For example, transducer heads of a storage device assembly may each be tested in a factory setting on different areas of a storage media to determine BPI read/write capability. An identification operation 504 identifies a subset of the transducer heads for which the determined linear storage density capability satisfies a predetermined threshold. For example, the identification operation 504 identifies a subset of the transducer heads that demonstrate a high BPI capability in reading and/or writing. An identification operation 506 identifies a storage area that is accessible by each transducer head in the identified subset of transducer heads with the read/write capability satisfies the predetermined threshold. A cache creation operation 508 selectively defines a cache region in the identified storage area accessible by at least one of the transducer heads of the identified subset. For example, the cache is defined on a disk that is read and written to by a transducer head that demonstrates a highest read/write performance within the storage device. Cache location may be further influenced by radial position. In some implementations, the cache creation operation 508 selectively defines the cache region in an outer diameter region of the storage medium that is accessible by one of the identified high-performing transducer heads.

The implementations described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations of the invention. Since many implementations of the invention can be made without departing from the spirit and scope of the invention, the invention resides in the claims hereinafter appended.

What is claimed is:

1. A method comprising:
   reading data from at least two consecutive elliptical data tracks in a main store region of a individual storage device into volatile memory of the individual storage device; and
   writing the data from the at least two consecutive elliptical data tracks to a spiral data track within a cache storage region of a magnetic disk of the individual storage device.

2. The method of claim 1, wherein reading of the data from the at least two consecutive elliptical tracks includes reading a greater number of total data bits from the main store region than a number of data bits written to the cache storage region during the writing of the read data.

3. The method of claim 1, wherein the at least two elliptical data tracks store data arranged in sectors of a first size and the spiral data track stores data arranged in sectors of a second size larger than the first size.

4. The method of claim 1, further comprising:
   reducing a total number of error correction data bits included in the data prior to writing the data to the spiral data track.

5. The method of claim 1, further comprising:
   reducing a total number of sector header bits included in the data prior to writing the data to the spiral data track.

6. The method of claim 1, wherein the spiral data track within the cache storage region is of a wider track width than data tracks in a main store region of the magnetic disk.

7. The method of claim 1, wherein the spiral data track within the cache storage region stores data at a higher linear storage density than data tracks of a main store region of the magnetic disk.

8. The method of claim 1, wherein the cache storage region is included in a storage device with multiple read/write heads and the method further comprises:
   selecting a write head to write the read data to the cache storage region, the selected write head capable of writing at a higher linear density that at least one other write head in the storage device.

9. A storage device comprising:
   a storage media including a cache storage region and a main store region; and
   a controller configured to control a transducer head to consecutive data tracks in the main store region and write the data read from the at least two.

10. The storage device of claim 9, wherein the cache region stores data in sectors of a first size and the main store region stores user data in sectors of a second size smaller than the first size.

11. The storage device of claim 9, wherein the controller is configured to reformat the data read from the at least two consecutive data tracks and write the reformatted data to the spiral data track, the reformatted data including fewer total data bits than the read data.

12. The storage device of claim 9, wherein the controller is configured to reduce at least one of sector header data bits or error correction data bits included in the data prior to writing the data to the spiral data track.

13. The storage device of claim 9, wherein the controller is further configured to select a transducer head for writing the data to the spiral data track, the selected transducer head capable of writing at a higher linear density that at least one other transducer head in the storage device.

14. The storage device of claim 9, wherein the spiral data track within the cache storage region is of a wider track width than each of the at least two consecutive data tracks.

15. The storage device of claim 9, wherein the controller is further configured to increase a linear storage density of the data when writing to the cache storage region as compared to a linear storage density of the data stored within the at least two data tracks of the main store region.

16. The storage device of claim 9, wherein the controller is configured to select a write element for writing the data to the cache storage region, the selected write element configured to write data at a higher linear storage density in the cache storage region than in the at least two consecutive data tracks.

* * * * *